United States Patent Office 3,443,967
Patented May 13, 1969

3,443,967
SALAD OIL FROM ZERO-ERUCIC ACID RAPESEED OIL
Barton F. Teasdale, Islington, Ontario, Canada, assignor to Canada Packers Limited, Toronto, Ontario, Canada
No Drawing. Filed Oct. 18, 1965, Ser. No. 497,548
Int. Cl. A23d 5/02
U.S. Cl. 99—118        4 Claims

ABSTRACT OF THE DISCLOSURE

Zero-erucic acid rapeseed oil is hydrogenated in the presence of a nickel hydrogenation catalyst to a linolenic acid content between about 0.1 and 1.5% and winterized to provide a salad oil in unexpectedly high yields.

---

This invention relates to the production of salad oil from rapeseed oil and, in particular, to the production of salad oil, in high yield, from zero-erucic acid rapeseed oil. The expression "zero-erucic acid" is intended to mean that the oil contains substantially no erucic acid, that is, no more than traces of such acid.

Rapeseed oil is well known to the oil industry. Its major characteristic is a high proportion of erucic acid, a $C_{22}$ mono unsaturated acid not commonly found in vegetable oils. It is classified as an erucic acid oil and, depending upon where the rapeseed is grown and on the variety, erucic acid may comprise from about ¼ to ½ of the total fatty acid content of the oil. When rapeseed was first introduced to Canada, where it is now extensively cultivated, there was some objection to using the oil in edible products because of its high erucic acid content. Plant breeders of the Canada Department of Agriculture and the University of Manitoba aided by Chemists of the Prairie Regional Laboratory of the National Research Council have recently succeeded in producing varieties of rapeseed, the oils of which contain no erucic acid. This is an outstanding scientific achievement.

The production of zero-erucic rapeseed has been described in a publication by Stefansson, Hougen and Downey, Can. J. Plant Sci. 41, 218–219 (1961). This development is further discussed by Sallans, Journal of the American Oil Chemists' Society 41, 215–218 (March 1964).

The fatty acid compositions of rapeseed oils from different rapeseed types and varieties compared with newly developed zero-erucic acid oils from several sources are set forth below (from Sallans, quoted above):

TABLE I

| Fatty Acid, Percent | B. napus | | | B. campestris | | |
|---|---|---|---|---|---|---|
| | Golden | Nugget | Zero-erucic | Polish | Arlo | Zero-erucic |
| Palmitic | 3.5 | 3.6 | 4.7 | 2.9 | 2.7 | 3.4 |
| Stearic | 1.2 | 1.4 | 1.8 | 1.2 | 1.5 | 1.1 |
| Oleic | 19.4 | 23.7 | 63.3 | 33.6 | 27.2 | 54.8 |
| Linoleic | 14.2 | 12.7 | 20.0 | 17.8 | 17.6 | 31.1 |
| Linolenic | 8.0 | 5.9 | 8.9 | 9.4 | 8.5 | 9.6 |
| Eicosenoic | 14.1 | 15.2 | 1.3 | 11.8 | 12.0 | 0.0 |
| Erucic | 39.6 | 37.5 | 0.0 | 23.3 | 30.5 | 0.0 |

It will be seen that the content of saturated fatty acids is slightly higher in the zero-erucic acid oils than in the usual regular rapeseed oils. Linolenic acid content for the zero-erucic acid oils is also slightly higher than for the regular rapeseed oils.

It is an object of this invention to provide a process for converting zero-erucic acid rapeseed oil into an edible product of commerce.

It is a further object of this invention to provide a process for preparing an edible product from zero-erucic acid rapeseed oil which will provide the best economic advantage for this particular oil.

It is well known that soyabean and rapeseed oil do not possess good flavour stability. The bland flavour of these oils brought about by refining, bleaching and deodorization gradually becomes stronger with time and eventually becomes objectionable. This is the so-called "flavour-reversion" characteristics of these oils.

It is generally agreed that the linolenic acid present in substantial amounts (5–10%) in the triglycerides of these oils is involved in this "flavour-reversion." When the amount of linolenic acid is decreased sufficiently by hydrogenation the rate of flavour reversion is decreased, that is, the flavour stability is improved. At about 3.0% linolenic acid the flavour stability is improved only slightly whereas at levels below 1% it is improved substantially.

Unfortunately as hydrogenation proceeds, triglycerides are formed which are solid at 50° F. and below so that the oil is no longer completely liquid at refrigerator temperatures. To restore this quality the hydrogenated oil must be chilled and the solid fat portion which crystallizes out thereby must be filtered out so that a clear, liquid "salad oil" is produced. This process is called "winterization." The greater the degree of hydrogenation the lower the yield of salad oil that is produced.

It has been reported by the Northern Regional Laboratory of the U.S.D.A (Evans, C. D. et al., J.A.O.C.S. 41, 260–263, 1964) that yields of salad oil to be expected from hydrogenated soyabean oil are:

Percent yield
Linolenic acid at—
  3.0% _____ 90
  1.0% _____ 75
  0.5% _____ 60

At the 0.5% linolenic acid level the process is economically unattractive because for every 100 lbs. of salad oil produced 167 lbs. of soyabean oil must be hydrogenated and winterized requiring relatively large expenditures for equipment and processing costs and 67 lbs. of by-product solid fat must be disposed of.

I have found that hydrogenation of zero-erucic acid rapeseed oil to reduce the linolenic acid content to between about 0.1 to 1.5%, to improve flavour, provides an oil that upon winterization produces an unexpectedly high yield of salad oil. With zero-erucic acid rapeseed oil hydrogenated to about 0.4 to 0.9% of linolenic acid, yields of salad oil of 94 to 96% have been obtained, whereas with regular rapeseed oil hydrogenated to the same extent the yield on winterization is in the order of 75%. As indicated above, soyabean oil hydrogenated to the same extent provides a yield of salad oil in the order of 60%. At the 0.5% linolenic acid level 100 lbs. of salad oil are produced from only 104–106 lbs. of hydrogenated zero-erucic acid oil. This represents a significant economic advantage.

The present invention, therefore, comprises the hydrogenation of zero-erucic acid rapeseed oil to a linolenic acid content between about 0.1 to 1.5% followed by winterization of the hydrogenated oil to provide a salad oil with good flavour stability. The best combination of high yields and improved flavour stability is obtained by hydrogenation of the oil to approximately 0.5% linolenic acid content.

By "salad oil" is meant an edible oil which will remain liquid at temperatures as low as 50° F. This can be accomplished by winterization of the hydrogenated oil at about 45° F. A salad oil which will remain liquid at lower temperatures can be made by using lower winterization temperatures.

Hydrogenation of the oil is accomplished by conventional procedures with the aid of nickel catalysts. Hydrogenation temperatures and pressures are not critical but are correlated to provide the desired degree of hydrogenation of the linolenic acid within a reasonably short period of time. Temperatures in the order of 340–370° F. at a pressure of about 5 p.s.i.g. are satisfactory.

The oil as received from the extracting plant is alkali refined and bleached by the usual procedure for processing edible oils.

The invention is further illustrated by the following examples of practice.

EXAMPLE I

Samples of three varieties of rapeseed oils were obtained as follows:

(A) Golden, containing 41.4% of erucic and 8.2% of linolenic acid, I.V. 100.9, (B) Nugget, containing 36.7% of erucic and 6.4% of linolenic acid, I.V. 98.0, (C) Zero-erucic, containing no erucic and 9.6% of linolenic acid, I.V. 116.8.

The complete fatty acid analyses of these three oils were:

[In percent]

|   | $C_{16}$ | $C_{16}^-$ | $C_{18}$ | $C_{18}^-$ | $C_{18}^{2-}$ | $C_{18}^{3-}$ | $C_{20}$ | $C_{20}^-$ | $C_{22}$ | $C_{22}^-$ | $C_{22}^{2-}$ |
|---|---|---|---|---|---|---|---|---|---|---|---|
| A | 2.8 | 0.2 | 1.1 | 16.8 | 13.7 | 8.2 | 1.4 | 13.2 | 0.5 | 41.4 | 0.7 |
| B | 3.0 | 0.2 | 1.5 | 23.5 | 12.4 | 6.4 | 0.7 | 15.0 | 0.6 | 36.7 |  |
| C | 3.6 | 0.2 | 2.0 | 61.6 | 21.2 | 9.6 | 0.2 | 1.6 |  |  |  |

500 gram samples of each of these three oils were subjected to hydrogenation at a temperature of 350–370° F. under a pressure of 5 p.s.i.g. in the presence of 0.2% nickel hydrogenation catalyst (25% Ni content) and 0.2% of diatomaceous silica ("Filter-Cel") for a time sufficient to reduce the linolenic acid content to between 0.2–0.9%. The results are given in the following tables:

TABLE II

| Oil | Time, Mins. | R.I. Zeiss Units | I.V. Found | I.V. Calc. from G.L.C. | Solids Content Index (by dilatometry) 50° F. | 70° F. | 80° F. | Wiley M.P., °C. |
|---|---|---|---|---|---|---|---|---|
| Golden | 10½ | 63.2 | 81.4 | 81.7 | 10.4 | 1.4 |  | <20 |
| Nugget | 7 | 63.0 | 81.0 | 83.4 | 6.3 | 1.4 |  | <20 |
| Zero-Erucic | 11½ | 62.8 | 89.0 | 91.1 | 2.6 | 1.2 |  | <20 |
| Do | 5½ |  | 87.4 | 88.4 | 3.0 | 1.6 |  | <20 |

TABLE II(A).—FATTY ACID ANALYSIS OF PRODUCTS

| Oil | $C_{16}$ | $C_{16}^-$ | $C_{18}$ | $C_{18}^-$ | $C_{18}^{2-}$ | $C_{18}^{3-}$ | $C_{20}$ | $C_{20}^-$ | $C_{22}$ | $C_{22}^-$ | Percent Trans |
|---|---|---|---|---|---|---|---|---|---|---|---|
| Golden | 2.6 | 0.2 | 1.3 | 31.1 | 6.3 | .08 | 1.1 | 14.2 | 0.6 | 41.5 | 14.0 |
| Nugget | 2.8 | 0.2 | 1.6 | 32.2 | 8.9 | 0.5 | 0.7 | 15.4 | 0.5 | 37.2 | 10.1 |
| Zero-Eurcic | 4.0 | 0.2 | 2.7 | 79.4 | 11.8 | 0.5 | 0.2 | 1.2 |  |  | 18.4 |
| Do | 3.6 | 0.3 | 2.1 | 82.8 | 8.6 | 0.2 | 0.6 | 1.8 |  |  | 20.2 |

From Table II above, it will be seen that an important difference between the hydrogenated regular rapeseed oils, Golden and Nugget, and the hydrogenated zero-erucic acid rapeseed oils is the substantially lower solids at 50° F. for the latter two products. This result is quite surprising since there are more "trans" acids in the zero-erucic acid products than in the Golden and Nugget products.

The low solids at 50° F. for the hydrogenated zero-erucic acid oils, with respect to the solids at 50° F. for the hydrogenated regular oils, holds true only for products which have been hydrogenated to a limited extent; that is, to reduce linolenic acid content to within the range specified above. When samples of the above oils were further hydrogenated to approximately 70 I.V., reducing the linolenic acid content to zero and saturating some of the other fatty acid components, the solids at 50° F. of the zero-erucic acid oil were much higher than those of the regular Golden and Nugget oils. The unexpected advantages of zero-erucic acid rapeseed oils therefore are primarily realized in the production of salad oils.

EXAMPLE II

Another sample of the zero-erucic acid rapeseed oil from a different crop grown in western Canada was alkali refined and bleached by conventional procedures. A sample of regular western Canada rapeseed oil was treated in a similar manner. The zero-erucic oil had an I.V. of 111.2 and the regular rapeseed had an I.V. of 106.0. The analyses of the two oils by Gas Liquid Chromatography (GLC) were as follows:

|  | $C_{14}$ | $C_{16}$ | $C_{16}^-$ | $C_{18}$ | $C_{18}^-$ | $C_{18}^{2-}$ | $C_{18}^{3-}$ | $C_{20}$ | $C_{20}^-$ | $C_{22}^-$ |
|---|---|---|---|---|---|---|---|---|---|---|
| Zero-Erucic | Tr. | 3.7 | 0.1 | 2.3 | 62.9 | 20.4 | 7.9 | 0.7 | 2.0 |  |
| Regular R/S | Tr. | 2.9 | 0.2 | 1.3 | 25.4 | 16.5 | 7.7 | 0.4 | 12.1 | 33.5 |

Hydrogenation: 500 gram or 1200 gram samples of the two above-identified oils were hydrogenated at a temperature of 350° F. ± 10° F. under a pressure of 5 p.s.i.g. in the presence of 0.2% nickel catalyst and 0.2% diatomaceous silica ("Filter-Cel"). The results are set forth in the following table:

TABLE III

| Run | Wt., gms. | Hydro'n. Time, Mins. | ZRI* | I.V. | $C_{18}{}^{3-}$, Percent | Trans, Percent | Solids Content Index (by dilatometry) | | | | |
|---|---|---|---|---|---|---|---|---|---|---|---|
| | | | | | | | 50° F. | 70° F. | 80° F. | 92 F. | 104 F. |
| ZERO-ERUCIC ACID OIL |||||||||||||
| 1 | 1,200 | 9 | 65.3 | 95.7 | 1.8 | | 1.1 | 0.4 | | | |
| 1a | 1,200 | 10 | 64.2 | 93.2 | 0.8 | | 1.1 | 0.8 | 0.5 | | |
| 1b | 1,200 | 11 | 63.2 | 91.1 | 0.3 | | 1.6 | 0.9 | 0.8 | | |
| 1c | 1,200 | 12 | 62.0 | 86.8 | 0.2 | | 3.0 | 1.8 | 1.0 | 0.2 | |
| 2 | 1,200 | 12 | 64.0 | | 0.7 | 12.9 | 2.1 | 1.2 | 1.0 | 1.0 | |
| 3 | 1,200 | 7¾ | 64.1 | 92.3 | 0.6 | 12.3 | 1.6 | 1.1 | 0.8 | 0.7 | |
| 4 | 500 | 6¾ | 64.0 | 92.1 | 0.7 | 12.7 | 2.1 | 1.9 | 1.8 | 1.6 | 0.5 |
| 5 | 500 | 10 | 64.0 | | | | | | | | |
| 5a | 500 | 10½ | 63.5 | 90.0 | 0.4 | 12.7 | 1.6 | 1.3 | 1.1 | 1.0 | 0.5 |
| REGULAR RAPESEED OIL |||||||||||||
| 6 | 1,200 | 14 | 65.6 | 90.5 | 1.5 | | 3.6 | 1.7 | 1.5 | 1.4 | |
| 6 | 1,200 | 16 | 64.1 | 86.5 | 0.8 | | | | | | |
| 6 | 1,200 | 17 | 63.3 | | | | 7.6 | 1.5 | 1.3 | 1.0 | |
| 6 | 1,200 | 18 | 62.8 | 83.7 | 0.1 | | 8.6 | 0.8 | 0.5 | 0.4 | |
| 7 | 1,200 | 15 | 64.2 | 86.0 | 0.5 | 14.7 | 6.1 | 1.3 | 1.1 | 1.0 | |
| 8 | 1,200 | 16 | 65.5 | | 1.5 | 11.2 | 0.8 | | 0.4 | 0.2 | |

*Refractive Index, Zeiss Units.

Winterizing: Seven of the above samples were "winterized" by holding them at 45–46° F. for from 2–5 days and filtering at 45° F. The yields, GLC analyses, trans contents and cold tests are summarized in the following table:

TABLE IV

| Run | Oil | Liquid Oil | | | | | Solid Cake | | |
|---|---|---|---|---|---|---|---|---|---|
| | | Yield, Percent | I.V. | $C_{18}{}^{3-}$, Percent | Trans, Percent | Cold Test, hrs. | I.V. | $C_{18}{}^{3-}$, Percent | Trans, Percent |
| 2 | Zero-Erucic | 94.8 | 93.4 | 0.8 | 13.3 | 12 | 80.2 | 0.4 | 18.1 |
| 4 | do | 94.4 | 93.1 | 0.8 | 11.5 | 12 | 81.5 | 0.5 | 17.5 |
| 1c | do | 89.4 | 89.5 | 0.3 | 13.4 | 7 | 83.0 | 0.2 | 16.6 |
| 3 | do | 96.8 | 93.8 | 0.9 | 13.4 | | 80.4 | 0.6 | 17.8 |
| 5a | do | 95.3 | 90.3 | 0.4 | 13.1 | | 79.2 | 0.2 | 18.2 |
| 7 | Regular R/S | 75.2 | 87.0 | 0.8 | 15.0 | 6 | 81.3 | 0.5 | 19.7 |
| 8 | do | 87 | 92.6 | 1.6 | | | 82.1 | 0.7 | |

It will be seen from Table III that during the hydrogenation the linolenic acid content of the zero-erucic acid oils was lowered to about 0.8% at 93.2 I.V. and to about 0.4% at 90.0 I.V. For the regular rapeseed oils the I.V.'s were between 90.5 and 86.5 for 1.0% linolenic acid and about 86.0 for 0.5% linolenic. The 50° F. solids of the hydrogenated zero-erucic acid oils were substantially lower than those for the regular rapeseed oil at the same linolenic acid levels. Winterization of the hydrogenated zero-erucic acid oil at linolenic acid levels of 0.4–0.9% provided yields of salad oil of 94.4–96.8%. When the zero-erucic acid oil was hydrogenated to reduce the linolenic acid content to 0.2% (Run 1c, Table III) the yield on winterization was lowered substantially (89.4%) even though there was but a slight reduction of the linolenic acid. Best results are obtained when the linolenic acid content is reduced by hydrogenation to approximately 0.5%. The yield of salad oil by winterization of hydrogenated regular rapeseed oil at 0.5% linolenic acid level is not nearly as favorable as with the zero-erucic oil, 75.2% as shown by Run 7. The oils are about equal with respect to flavour stability and other properties.

I claim:

1. A process for the production of salad oil comprising hydrogenating zero-erucic acid rapeseed oil in the presence of a nickel hydrogenation catalyst to reduce the linolenic acid content to about 0.1 to 1.5% and winterizing the hydrogenated oil to provide a salad oil having good flavour stability.

2. The process of claim 1 wherein the hydrogenated oil is winterized at a temperature of about 45° F.

3. The process of claim 1 wherein the oil is hydrogenated to about 0.5% linolenic acid content and is winterized at a temperature of about 45° F.

4. A process for the selective hydrogenation of zero-erucic acid rapeseed oil comprising hydrogenating said oil in the presence of a nickel hydrogenation catalyst until the linolenic acid content of the oil is reduced to between about 0.1 to 1.5%.

References Cited

UNITED STATES PATENTS 3,169,981  2/1965  Kuwata et al. _____ 99—118 X
3,173,936  3/1965  Kirkpatrick _____ 99—118 X
3,278,568  10/1966 De Jonge et al _____ 99—118 X

OTHER REFERENCES

Sallans, H. R.: "Journal of the American Oil Chemists' Association," pp. 215–218, vol. 41, March 1964.

MAURICE W. GREENSTEIN, *Primary Examiner.*

U.S. Cl. X.R.

99—144; 260—409

PO-1050
(5/69)

UNITED STATES PATENT OFFICE
CERTIFICATE OF CORRECTION

Patent No. 3,443,967          Dated May 13, 1969

Inventor(s)     Barton F. Teasdale

It is certified that error appears in the above-identified patent and that said Letters Patent are hereby corrected as shown below:

Column 3, table at the bottom of the page "$C_{18}5=$" should read "$C_{18}3=$".

Column 4, table II(A), in the first line under column $C_{18}3=$ "0.08%" should read "0.8%".

SIGNED AND
SEALED

SEP 2 - 1969

(SEAL)
Attest:

Edward M. Fletcher, Jr.
Attesting Officer

WILLIAM E. SCHUYLER, JR.
Commissioner of Patents